United States Patent
Yoshida et al.

(10) Patent No.: US 6,807,818 B2
(45) Date of Patent: Oct. 26, 2004

(54) COMPRESSOR SYSTEM AND VEHICLE AIR CONDITIONING SYSTEM HAVING THE SAME

(75) Inventors: Satohisa Yoshida, Anjo (JP); Koji Yamashita, Obu (JP); Shigeki Ohya, Nagoya (JP); Makoto Umebayashi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/673,558

(22) Filed: Sep. 30, 2003

(65) Prior Publication Data

US 2004/0123611 A1 Jul. 1, 2004

(30) Foreign Application Priority Data

Oct. 2, 2002 (JP) ........................................ 2002-289805

(51) Int. Cl.$^7$ .............................. F25B 1/00; F25B 49/00
(52) U.S. Cl. .................. 62/228.3; 62/228.5; 417/222.2; 417/290
(58) Field of Search ............................... 62/157, 228.3, 62/228.5; 417/213, 222.1, 222.2, 269, 290

(56) References Cited

U.S. PATENT DOCUMENTS

| | | | | |
|---|---|---|---|---|
| 5,065,589 A | * | 11/1991 | Taguchi ........................ | 62/161 |
| 6,164,925 A | * | 12/2000 | Yokomachi et al. ...... | 417/222.2 |
| 6,266,967 B1 | | 7/2001 | Honda | |
| 6,526,771 B2 | * | 3/2003 | Takano et al. ............. | 62/228.3 |

* cited by examiner

Primary Examiner—Marc Norman
(74) Attorney, Agent, or Firm—Posz & Bethards, PLC

(57) ABSTRACT

When a compressor apparatus is operated at a maximum displacement for 60 minutes or longer, an ECU controls a pressure control valve to gradually change the refrigerant pressure in a swash plate chamber in a manner that gradually reduces the displacement of the compressor apparatus. In this way, it is possible to create a state, in which a relatively large pressure difference is created between a refrigerant inlet side and the swash plate chamber. Thus, refrigerant oil accumulated in the swash plate chamber can be returned to the refrigerant inlet side of the compressor apparatus at the time of gradually reducing the displacement of the compressor apparatus.

8 Claims, 4 Drawing Sheets

COMPRESSOR SYSTEM AND VEHICLE AIR CONDITIONING SYSTEM HAVING THE SAME

CROSS REFERENCE TO RELATED APPLICATION

This application is based on and incorporates herein by reference Japanese Patent Application No. 2002-289805 filed on Oct. 2, 2002.

BACKGROUND OF THE INVENTION

1. Field of the Invention

The present invention relates to a compressor system, which includes a variable displacement compressor apparatus, and a vehicle air conditioning system having the compressor system.

2. Description of Related Art

In a prior art air conditioning system (vapor compression refrigeration system), the refrigerant pressure in a low pressure side of the air conditioning system is changed several times by intermittently disconnecting and connecting an electromagnetic clutch to return refrigerant oil, which is accumulated in a refrigerant pipe, to a fixed displacement compressor of the air conditioning system when a predetermined time period is elapsed since the time of starting the fixed displacement compressor. Such an air conditioning system is disclosed in, for example, Japanese Unexamined Patent Publication No. 2000-283576, which corresponds to U.S. Pat. No. 6,266,967.

In a case of a previously proposed variable displacement compressor apparatus of a swash plate type, the refrigerant pressure in a control pressure chamber, i.e., in a swash plate chamber is controlled to control a stroke of a piston, which compresses refrigerant, through a swash plate received in the swash plate chamber. When the refrigerant pressure in the swash plate chamber is changed, it causes a change in the balance between the force, which is applied to the piston by the refrigerant pressure in the swash plate chamber via the swash plate, and the compressive reaction force, which is applied to the piston from the compressed refrigerant. The change in the balance then causes a change in a rotational angular momentum for tilting the swash plate to change the stroke of the piston, thereby changing the displacement of the compressor apparatus.

Here, the displacement is a theoretical geometrical displacement of refrigerant discharged from the compressor apparatus per rotation of a shaft of the compressor, which is driven by, for example, a vehicle engine.

Normally, the swash plate chamber is always communicated with a refrigerant inlet side of the compressor apparatus through a choke means, such as an orifice, and is also communicated with a refrigerant outlet side of the compressor apparatus through a control valve, which can change a size of opening, i.e., a degree of opening in a passage that communicates between the swash plate chamber and the refrigerant outlet of the compressor apparatus. The pressure in the swash plate chamber is controlled by controlling a degree of opening of the control valve.

Normally, at the time of maximizing the displacement of the compressor apparatus, the control valve is closed to reduce the pressure of the swash plate chamber to a level that is substantially equal to the intake pressure of the compressor apparatus at the refrigerant inlet of the compressor apparatus. On the other hand, at the time of reducing the displacement, the control valve is opened to increase the pressure of the swash plate chamber.

Thus, when the displacement is maximized, the pressure difference between the pressure in the refrigerant inlet side of the compressor apparatus and the pressure in the swash plate chamber is significantly reduced, so that the refrigerant, which includes refrigerant oil serving as blowby gas flown into the swash plate chamber through a space between the piston and a cylinder bore, is accumulated in the swash plate chamber. Thus, the amount of refrigerant oil, which is returned to the compressor apparatus after circulating through the vapor compression refrigeration system is disadvantageously reduced.

Furthermore, the sliding surfaces of the piston and of the cylinder bore are lubricated by the refrigerant oil returned to the compressor apparatus. Thus, when the amount of refrigerant oil returned to the compressor apparatus is reduced, the piston and the cylinder bore can be seized due to the shortage of the refrigerant oil.

It is possible to increase the amount of refrigerant oil mixed into the refrigerant to address the above disadvantage. However, when the amount (i.e., an oil rate) of refrigerant oil contained in the refrigerant is increased, a heat transfer coefficient is reduced by the refrigerant oil adhered to the inner surfaces of the evaporator or of the condenser to reduce heat exchange performance.

SUMMARY OF THE INVENTION

The present invention addresses the above disadvantages. Thus, it is an objective of the present invention to provide a novel compressor system, which is different from previously proposed compressor systems. It is another objective of the present invention to provide a vehicle air conditioning system having such a compressor system. It is a further objective of the present invention to limit accumulation of a relatively large amount of refrigerant oil in a control pressure chamber of a compressor apparatus of the compressor system.

To achieve the objectives of the present invention, there is provided a compressor system that includes a variable displacement compressor apparatus, a pressure regulating means and a control means. The compressor apparatus includes a refrigerant inlet, a refrigerant outlet, a piston and a control pressure chamber. The refrigerant is suctioned into the compressor apparatus through the refrigerant inlet. The refrigerant is discharged from the compressor apparatus through the refrigerant outlet. The piston is reciprocably driven upon rotation of the compressor apparatus to compress refrigerant supplied from the refrigerant inlet. The control pressure chamber is connected to the refrigerant inlet and the refrigerant outlet and receives refrigerant pressure from at least one of the refrigerant inlet and the refrigerant outlet. The refrigerant pressure in the control pressure chamber regulates a stroke of the piston to regulate a displacement of the compressor apparatus. The pressure regulating means is for regulating the refrigerant pressure in the control pressure chamber. The control means is for controlling the pressure regulating means. When the compressor apparatus is operated at a maximum displacement for a predetermined time period, the control means controls the pressure regulating means to gradually change the refrigerant pressure in the control pressure chamber in a manner that gradually reduces the displacement of the compressor apparatus.

To achieve the objectives of the present invention, there is also provided a vehicle air conditioning system that includes the above-described compressor system and at least one evaporator, which exchanges heat between depressurized refrigerant and air to be discharged into a passenger compartment of a vehicle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
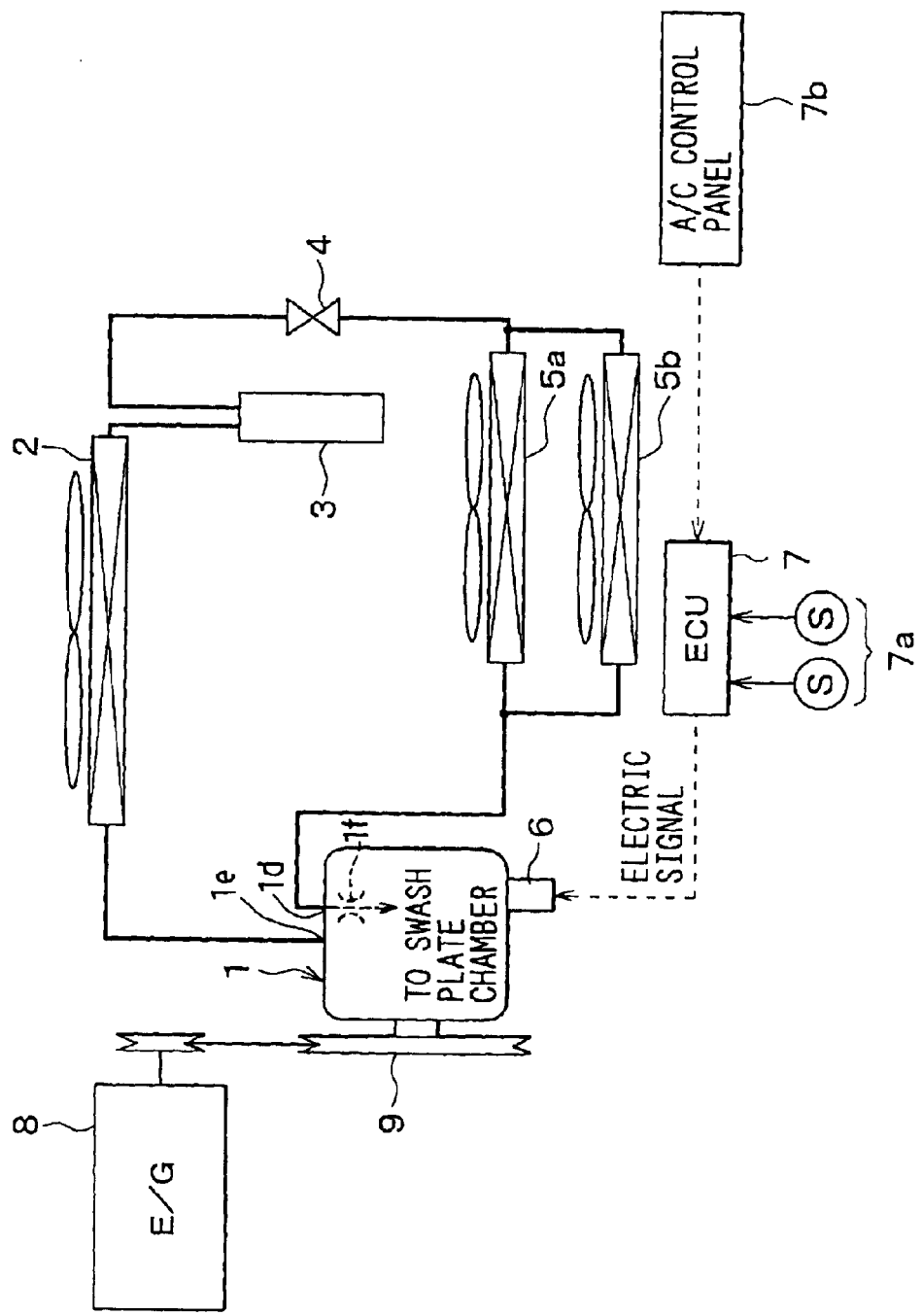
FIG. 1 is a schematic view of a vehicle air conditioning system (vapor compression refrigeration system) according to a first embodiment of the present invention.

A compressor system for a vehicle air conditioning system according to a first embodiment of the present invention will be described with reference to the accompanying drawings. FIG. 1 is a schematic view of the vehicle air conditioning system (vapor compression refrigeration system).

The vehicle air conditioning system (vapor compression refrigeration system) includes a variable displacement compressor apparatus 1, a radiator 2, a receiver 3, a depressurizer 4 and two evaporators (heat exchangers) 5a, 5b. The radiator 2 cools refrigerant through heat exchange between the outside air and high temperature and high pressure refrigerant, which is compressed by the compressor apparatus 1. The receiver 3 separates refrigerant, which is supplied from the radiator 2, into liquid phase refrigerant and vapor phase refrigerant and accumulates excessive refrigerant as liquid phase refrigerant. The depressurizer 4 depressurizes the liquid phase refrigerant supplied from the receiver 3. The evaporators 5a, 5b evaporate the liquid phase refrigerant through heat exchange between the depressurized low temperature refrigerant and the air to be discharged into a passenger compartment of a vehicle.

The evaporator 5a is a front seat side evaporator, which exchanges heat with the air to be discharged from a front side of the passenger compartment into the passenger compartment. The evaporator 5b is a rear seat side evaporator, which exchanges heat with the air to be discharged from a rear side of the passenger compartment into the passenger compartment.

Figure 2:
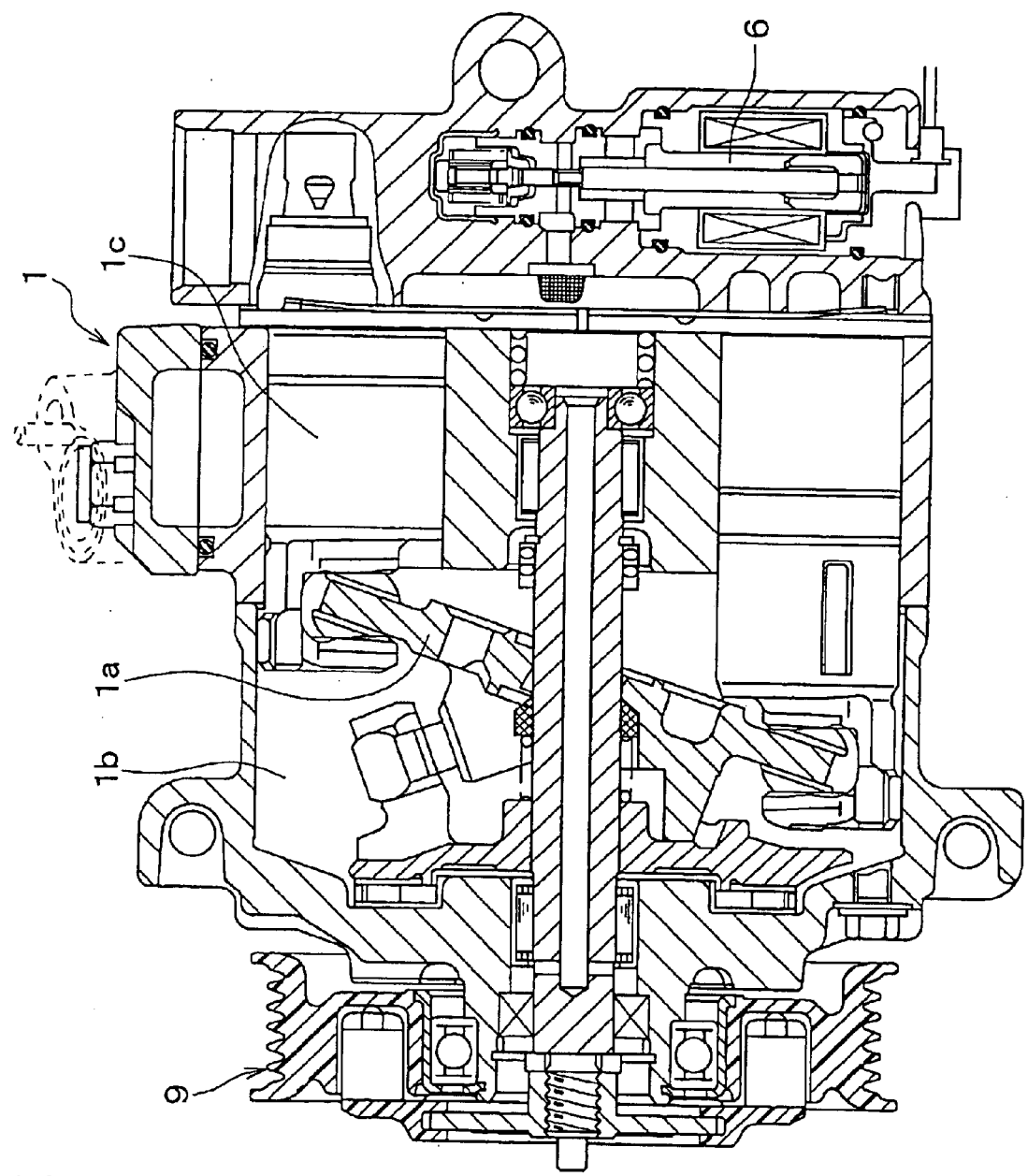
FIG. 2 is a cross sectional view of a variable displacement compressor apparatus of a swash plate type according to the first embodiment.

FIG. 2 is a cross sectional view of the variable displacement compressor apparatus 1 of a swash plate type. As is well known in the art, the compressor apparatus 1 can change its displacement by changing a tilt angle of a swash plate 1a, i.e., a stroke of a piston 1c, which is connected to the swash plate 1a, through control of the refrigerant pressure in a swash plate chamber (crank case) 1b, which serves as a control pressure chamber.

Specifically, a refrigerant inlet 1d of the compressor apparatus 1 and the swash plate chamber 1b are always communicated to one another through a choke 1f, such as an orifice or a capillary tube, which induces a predetermined pressure loss. Furthermore, there is provided a pressure control valve (serving as a pressure regulating means) 6, which controls a state of communication, i.e., a degree of communication in a pressure conducting passage (not shown) that communicates between a refrigerant outlet 1e of the compressor apparatus 1 and the swash plate chamber 1b. At the time of increasing the displacement of the compressor apparatus 1, the pressure conducting passage is choked or is closed by the pressure control valve 6 to reduce the pressure in the swash plate chamber 1b. On the other hand, at the time of reducing the displacement of the compressor apparatus 1, the pressure control valve 6 is opened to increase the pressure in the swash plate chamber 1b.

Thus, when the displacement of the compressor apparatus 1 is maximized, the pressure in the swash plate chamber 1b is substantially equal to the intake pressure of the compressor apparatus 1 at the refrigerant inlet 1d. On the other hand, when the displacement of the compressor apparatus 1 is minimized, the pressure in the swash plate chamber 1b is substantially equal to the discharge pressure of the compressor apparatus 1 at the refrigerant outlet 1e.

As shown in FIG. 1, the pressure control valve 6 is controlled by an electronic control unit (ECU) 7, which serves as a control means. At the time of normal operation, the pressure control valve 6 is duty controlled by the ECU 7 in such a manner that the pressure (evaporation temperature) in the evaporator 5 or the temperature of the air right after passing the evaporator 5 is substantially maintained at a corresponding predetermined value.

The ECU 7 receives various measured signals, which are transmitted from various air conditioning sensors 7a, and also receives various set values, which are set by a passenger and are transmitted from a control panel 7b. The air conditioning sensors 7a includes an outside air temperature sensor, which measures the outside air temperature outside the passenger compartment, an inside air temperature sensor, which measures the inside air temperature inside the passenger compartment, and a post evaporator air temperature sensor, which measure the temperature of the air right after passing the evaporator 5.

The compressor apparatus 1 is driven by drive force received from an internal combustion engine (serving as a vehicle drive power source), i.e., an engine 8. The compressor apparatus 1 is mechanically connected to the engine 8 through a V-belt and a pulley 9 and is driven in synchronism with start and stop of the engine 1.

Characteristic operation of the present embodiment will be described with reference to a flow chart shown in FIG. 3.

Figure 3:
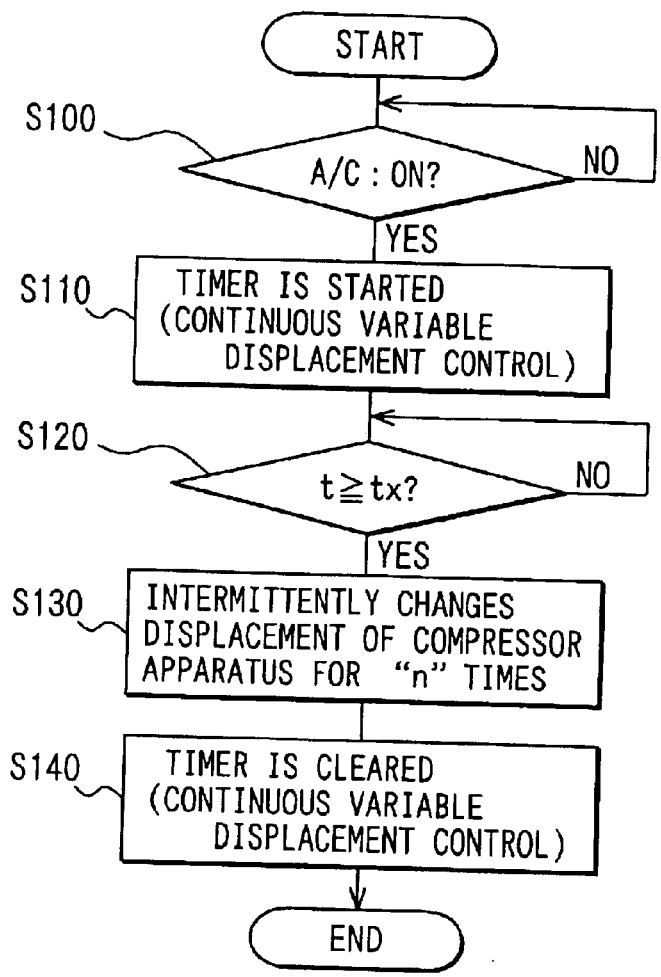
FIG. 3 is a flow chart showing control operation of a compressor system having the compressor apparatus according to the first embodiment.
Figure 4:
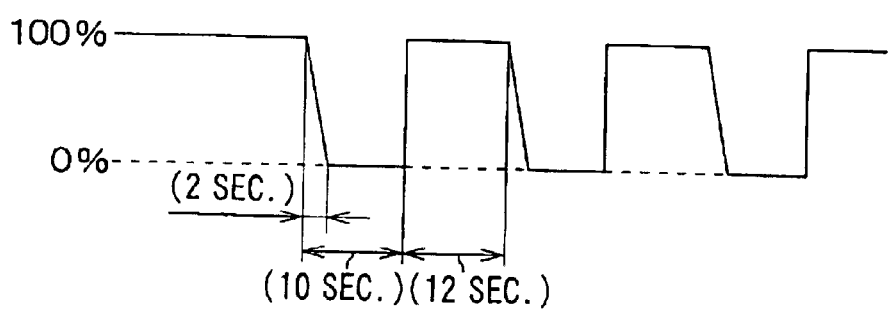
FIG. 4 is a descriptive view showing control characteristics of the compressor system according to the first embodiment.

With reference to FIGS. 3 and 4, when an operation time period of the compressor apparatus 1 at the maximum displacement exceeds a predetermined time period (in the present embodiment, this is 60 minutes), the displacement of the compressor apparatus 1 is gradually reduced to the minimum displacement through a predetermined time period (in the present embodiment, this is about 2 seconds). Then, when an operation time period of the compressor apparatus 1 at the minimum displacement exceeds a predetermined time period (in the present embodiment, this is about 10 seconds), the operation of the compressor apparatus 1 is returned to the maximum displacement through an oil return operation. The series of the above operations (S100–S140) is repeated at least three times, as shown in FIG. 4.

Next, advantages of the present embodiment will be described.

In the operation of the compressor apparatus 1 at the maximum displacement, as discussed above, a pressure difference between the pressure in the refrigerant inlet 1d side of the compressor apparatus 1 and the pressure in the swash plate chamber 1b is minimized, so that refrigerant including refrigerant oil, which is blowby gas supplied into the swash plate chamber 1b through a space between the piston 1c and the corresponding cylinder bore, is accumulated in the swash plate chamber 1b.

Furthermore, in the operation of the compressor apparatus 1 at the minimum displacement, the pressure in the swash plate chamber 1b is substantially equal to the pressure at the refrigerant outlet 1e side of the compressor apparatus 1. However, when the displacement of the compressor apparatus 1 is reduced, the pressure difference between the discharge pressure and the intake pressure of the compressor apparatus 1 is reduced. Thus, similar to the operation time period of the compressor apparatus 1 at the maximum displacement, in the operation time period of the compressor apparatus 1 at the minimum displacement, the pressure difference between the pressure in the refrigerant inlet 1d side and the pressure in the swash plate chamber 1b is reduced, and thereby the refrigerant oil accumulated in the swash plate chamber 1b cannot be discharged into the refrigerant inlet 1d side of the compressor apparatus 1.

Figure 5:
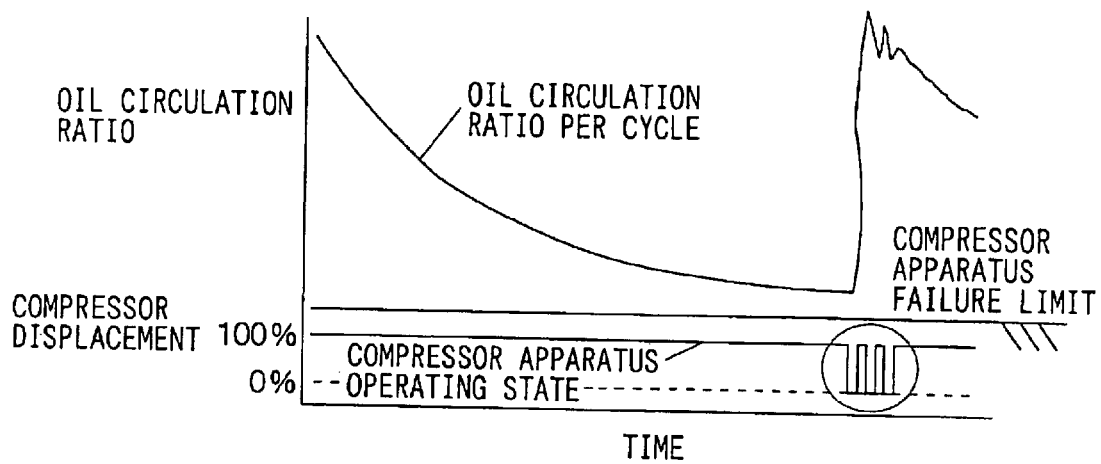
FIG. 5 is a descriptive view showing advantages of the compressor system according to the first embodiment.

However, according to the present embodiment, the displacement is gradually reduced through the predetermined time period, so that it is possible to create a state, at which a relatively large increase in the pressure difference between the pressure in the refrigerant inlet 1d side of the compressor apparatus 1 and the pressure in the swash plate chamber 1b is achieved. Thus, as shown in FIG. 5, at the time of gradually reducing the displacement of the compressor apparatus 1, the refrigerant oil accumulated in the swash plate chamber 1b can be returned to the refrigerant inlet 1d side of the compressor apparatus 1. As a result, seizing of the piston 1c and the cylinder bore can be advantageously avoided without substantially increasing the amount of refrigerant oil mixed into the refrigerant. In the first embodiment, the compressor apparatus 1, the control valve 6 and the ECU 7 constitute the compressor system.

Second Embodiment

In the first embodiment, the displacement of the compressor apparatus 1 is gradually reduced from the maximum displacement to the minimum displacement in the oil return operation. In the present embodiment, the displacement of the compressor apparatus 1 is gradually changed from the maximum displacement to an intermediate displacement and is then rapidly reduced from the intermediate displacement to the minimum displacement, as shown in FIG. 6.

In this way, similar to the first embodiment, it is possible to create a state, at which a relatively large increase in the pressure difference between the pressure in the refrigerant inlet 1d side of the compressor apparatus 1 and the pressure in the swash plate chamber 1b is achieved. Therefore, the refrigerant oil accumulated in the swash plate chamber 1b can be returned into the refrigerant inlet 1d side of the compressor apparatus 1 at the time of gradually reducing the displacement of the compressor apparatus 1.

Figure 6:
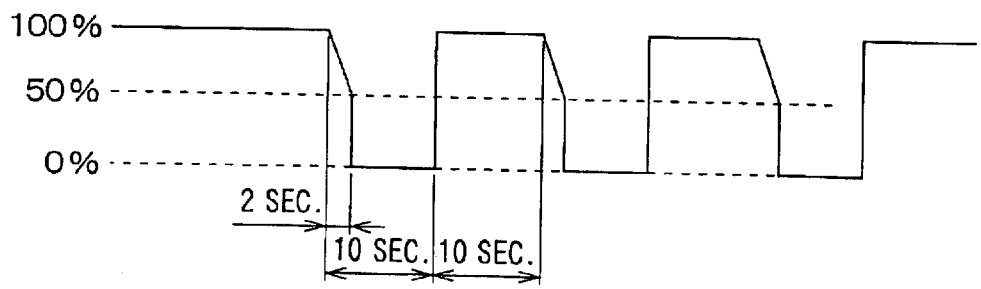
FIG. 6 is a descriptive view showing control characteristics of a compressor system according to a second embodiment of the present invention.

In FIG. 6, 50% of the maximum displacement is used as the intermediate displacement of the compressor apparatus 1. However, it should be noted, the intermediate displacement can be any value between the maximum displacement and the minimum displacement and does not necessarily mean 50% of the maximum volume.

Third Embodiment

Figure 7:
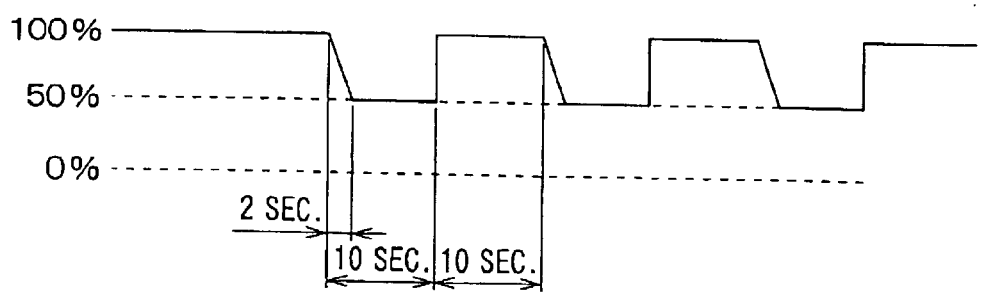
FIG. 7 is a descriptive view showing control characteristics of a compressor system according to a third embodiment of the present invention.

In the above embodiments, the displacement is reduced to the minimum displacement at the end in the oil return operation. However, in the present embodiment, as shown in FIG. 7, the displacement is gradually reduced from the maximum displacement to the intermediate displacement and is then increased to the maximum displacement in a single cycle.

The present embodiment is effective for the air conditioning system having one evaporator, i.e., the single air conditioning system.

Modifications

In the above embodiment, the present invention is embodied in the vehicle air conditioning system. However, the present invention is not limited to this.

Furthermore, in the above embodiments, the swash plate chamber 1b and the refrigerant inlet 1d side of the compressor apparatus 1 are always communicated to one another through the choke 1f, and the swash plate chamber 1b and the refrigerant outlet 1e side of the compressor apparatus 1 are communicated to one another through the pressure control valve 6. However, the present invention is not limited to this. For example, the swash plate chamber 1b and the refrigerant outlet 1e side of the compressor apparatus 1 can be always communicated to one another through a choke, and the swash plate chamber 1b and the refrigerant inlet 1s side of the compressor apparatus 1 can be communicated to one another through the pressure control valve 6.

In the above embodiment, the oil return operation is performed after the successive operation of the compressor apparatus 1 at the maximum displacement for the predetermined time period of 60 minutes or longer. However, this predetermined time period is not limited to 60 minutes or longer.

In the above embodiments, the time period for changing the pressure in the swash plate chamber 1b is set as two seconds. However, the present invention is not limited to this.

In the above embodiments, the displacement of the compressor apparatus 1 is cyclically changed, and one cycle is set as twelve seconds. However, the present invention is not limited to this.

Additional advantages and modifications will readily occur to those skilled in the art. The invention in its broader terms is therefore not limited to the specific details, representative apparatus, and illustrative examples shown and described.

What is claimed is:

1. A compressor system comprising:
   a variable displacement compressor apparatus, wherein the compressor apparatus includes:
      a refrigerant inlet, through which refrigerant is suctioned into the compressor apparatus;
      a refrigerant outlet, through which refrigerant is discharged from the compressor apparatus;
      a piston, which is reciprocably driven upon rotation of the compressor apparatus to compress refrigerant supplied from the refrigerant inlet; and
      a control pressure chamber, which is connected to the refrigerant inlet and the refrigerant outlet and receives refrigerant pressure from at least one of the refrigerant inlet and the refrigerant outlet, wherein the refrigerant pressure in the control pressure chamber regulates a stroke of the piston to regulate a displacement of the compressor apparatus;
   a pressure regulating means for regulating the refrigerant pressure in the control pressure chamber; and
   a control means for controlling the pressure regulating means, wherein when the compressor apparatus is operated at a maximum displacement for a predetermined time period, the control means controls the pressure regulating means to gradually change the refrigerant pressure in the control pressure chamber in a manner that gradually reduces the displacement of the compressor apparatus.

2. The compressor system according to claim 1, wherein:

the pressure regulating means is a control valve, which changes at least one of:
 a degree of communication between the refrigerant inlet and the control pressure chamber; and
 a degree of communication between the control pressure chamber and the refrigerant outlet; and when the refrigerant pressure in the control pressure chamber is kept substantially equal to the refrigerant pressure at the refrigerant inlet for the predetermined time period to maximize the displacement of the compressor apparatus, the control means controls the control valve such that the refrigerant pressure in the control pressure chamber is gradually changed toward the refrigerant pressure at the refrigerant outlet to gradually reduce the displacement of the compressor apparatus.

3. The compressor system according to claim 2, wherein:

the refrigerant inlet is communicated with the control pressure chamber through a choke;

the control valve is positioned between the control pressure chamber and the refrigerant outlet and changes the degree of communication between the control pressure chamber and the refrigerant outlet; and when the refrigerant pressure in the control pressure chamber is kept substantially equal to the refrigerant pressure at the refrigerant inlet for the predetermined time period by closing the control valve, the control means gradually opens the control valve to gradually change the refrigerant pressure in the control pressure chamber toward the refrigerant pressure in the refrigerant outlet.

4. The compressor system according to claim 1, wherein:

the control pressure chamber receives a tiltable swash plate, which is connected to the piston; and a tilt angle of the swash plate is regulated by the refrigerant pressure in the control pressure chamber to regulate the stroke of the piston.

5. The compressor system according to claim 1, wherein the predetermined time period is 60 minutes or longer.

6. The compressor system according to claim 1, wherein after elapse of the predetermined time period, the control means controls the pressure regulating means to perform the changing of the refrigerant pressure in the control pressure chamber at least three times.

7. The compressor system according to claim 1, wherein after elapse of the predetermined time period, the control means controls the pressure regulating means to cyclically perform the changing of the refrigerant pressure in the control pressure chamber in three cycles, and each cycle takes twelve seconds to change the refrigerant pressure in the control pressure chamber.

8. A vehicle air conditioning system comprising:

at least one evaporator, which exchanges heat between depressurized refrigerant and air to be discharged into a passenger compartment of a vehicle; and a compressor system that includes:
 a variable displacement compressor apparatus, wherein the compressor apparatus includes:
  a refrigerant inlet, through which refrigerant is suctioned into the compressor apparatus;
  a refrigerant outlet, through which refrigerant is discharged from the compressor apparatus;
  a piston, which is reciprocably driven upon rotation of the compressor apparatus to compress refrigerant supplied from the refrigerant inlet; and
  a control pressure chamber, which is connected to the refrigerant inlet and the refrigerant outlet and receives refrigerant pressure from at least one of the refrigerant inlet and the refrigerant outlet, wherein the refrigerant pressure in the control pressure chamber regulates a stroke of the piston to regulate a displacement of the compressor apparatus;
 a pressure regulating means for regulating the refrigerant pressure in the control pressure chamber; and
 a control means for controlling the pressure regulating means, wherein when the compressor apparatus is operated at a maximum displacement for a predetermined time period, the control means controls the pressure regulating means to gradually change the refrigerant pressure in the control pressure chamber in a manner that gradually reduces the displacement of the compressor apparatus.

* * * * *